(12) United States Patent
Chaponniere

(10) Patent No.: US 9,055,612 B2
(45) Date of Patent: Jun. 9, 2015

(54) QUALITY OF SERVICE CONTINUITY

(75) Inventor: Etienne F. Chaponniere, Rome (IT)

(73) Assignee: QUALCOMM Incorporated, San Diego, CA (US)

( * ) Notice: Subject to any disclaimer, the term of this patent is extended or adjusted under 35 U.S.C. 154(b) by 803 days.

(21) Appl. No.: 12/368,668

(22) Filed: Feb. 10, 2009

(65) Prior Publication Data

US 2009/0201884 A1 Aug. 13, 2009

Related U.S. Application Data

(60) Provisional application No. 61/027,777, filed on Feb. 11, 2008.

(51) Int. Cl.
| | |
|---|---|
| H04W 4/00 | (2009.01) |
| H04W 92/20 | (2009.01) |
| H04W 28/24 | (2009.01) |
| H04W 36/00 | (2009.01) |
| H04W 36/08 | (2009.01) |
| H04W 80/02 | (2009.01) |

(52) U.S. Cl.
CPC .............. *H04W 92/20* (2013.01); *H04W 28/24* (2013.01); *H04W 36/0044* (2013.01); *H04W 36/08* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 6,901,065 B1 | 5/2005 | Ehrstedt et al. | |
| 7,224,704 B2 * | 5/2007 | Lu et al. | 370/476 |
| 7,233,583 B2 * | 6/2007 | Asthana et al. | 370/332 |
| 7,907,970 B2 * | 3/2011 | Park et al. | 455/561 |
| 2003/0142648 A1 * | 7/2003 | Semper | 370/331 |
| 2004/0037304 A1 * | 2/2004 | Khawand et al. | 370/432 |
| 2004/0067754 A1 * | 4/2004 | Gao et al. | 455/442 |
| 2004/0085926 A1 | 5/2004 | Hwang et al. | |
| 2006/0068789 A1 * | 3/2006 | Vannithamby et al. | 455/436 |

(Continued)

FOREIGN PATENT DOCUMENTS

| | | |
|---|---|---|
| CN | 1879363 A | 12/2006 |
| EP | 1887809 A1 | 2/2008 |

(Continued)

OTHER PUBLICATIONS

International Search Report and the Written Opinion—PCT/US2009/033807, International Search Authority—European Patent Office—Jun. 16, 2009.

(Continued)

*Primary Examiner* — Chi H Pham
*Assistant Examiner* — Soon-Dong D Hyun
(74) *Attorney, Agent, or Firm* — François A. Pelaez

(57) ABSTRACT

Systems and methodologies are described that facilitate supporting Quality of Service (QoS) continuity during an inter-base station mobility procedure. Layer 2 (L2) protocol configuration information for QoS (e.g., uplink, downlink, ... ) and/or uplink QoS configuration information set by a source base station can be transmitted via an interface (e.g., X2 interface, ... ) to a target base station during an inter-base station mobility procedure. Further, the target base station can select whether to reuse at least a portion of the L2 protocol configuration information for QoS and/or uplink QoS configuration information received from the source base station. Moreover, L2 protocol configuration information for QoS and/or uplink QoS configuration information not selected to be reused can be reconstructed.

48 Claims, 10 Drawing Sheets

(56) References Cited

U.S. PATENT DOCUMENTS

| | | |
|---|---|---|
| 2007/0025297 A1 | 2/2007 | Lee et al. |
| 2007/0054632 A1* | 3/2007 | Lu et al. .................. 455/101 |
| 2007/0081492 A1 | 4/2007 | Petrovic et al. |
| 2007/0109986 A1* | 5/2007 | Kwak et al. .................. 370/316 |
| 2008/0019320 A1 | 1/2008 | Phan et al. |
| 2008/0039088 A1* | 2/2008 | Fukushima et al. .......... 455/436 |
| 2008/0176566 A1* | 7/2008 | Akita .......................... 455/436 |
| 2009/0005047 A1* | 1/2009 | Gupta et al. .................. 455/437 |
| 2009/0323533 A1* | 12/2009 | Ohta .............................. 370/236 |

FOREIGN PATENT DOCUMENTS

| | | |
|---|---|---|
| JP | 2007536786 A | 12/2007 |
| KR | 20060062943 A | 6/2006 |
| RU | 2263400 | 10/2005 |
| RU | 2263415 | 10/2005 |
| TW | 200729987 | 8/2007 |
| WO | WO2006062306 | 6/2006 |
| WO | WO2006128380 | 12/2006 |
| WO | WO2007145340 A1 | 12/2007 |
| WO | WO2008010063 | 1/2008 |

OTHER PUBLICATIONS

"3GPP TS 36.300 V8.3.0 (Dec. 2007) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", Dec. 2007, pp. 1-121.

3GPP TS 36.422 V8.0.0, Evolved Universal Terrestrial Access Network (E-UTRAN); X2 signaling transport, Dec. 2007, http://www.3gpp.org/ftp/Specs/archive/36_series/36.422/36422-800.zip.

Taiwan Search Report—TW098104376—TIPO—Sep. 25, 2012.

* cited by examiner

QUALITY OF SERVICE CONTINUITY

CROSS-REFERENCE TO RELATED APPLICATIONS

This application claims the benefit of U.S. Provisional Patent Application Ser. No. 61/027,777 entitled "METHOD AND APPARATUS FOR PROVIDING QOS CONTINUITY IN LTE" which was filed Feb. 11, 2008. The entirety of the aforementioned application is herein incorporated by reference.

BACKGROUND

I. Field

The following description relates generally to wireless communications, and more particularly to providing Quality of Service (QoS) continuity in connection with a mobility procedure in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

As part of a typical Quality of Service (QoS) model, a central node within a core network oftentimes manages a subset of parameters related to QoS. The central node, for instance, can be a Packet Data Network Gateway (PDN GW). The PDN GW can provide a description parameter to a serving base station that indicates a type of traffic (e.g., uplink and/or downlink traffic) to be transferred between two endpoints (e.g., between the PDN GW and an access terminal, . . . ) through one or more intermediate nodes (e.g., the serving base station, Serving Gateway (S-GW), . . . ). For instance, the description parameter can be a QoS Class Index (QCI) that describes the type of traffic (e.g., voice, streaming video, . . . ). The serving base station can receive and utilize the description parameter to identify the traffic type, and can initialize and/or control a disparate subset of parameters related to QoS (e.g., Layer 2 (L2) parameters, logical channel priority, Prioritized Bit Rate (PBR), Maximum Bit Rate (MBR), Guaranteed Bit Rate (GBR), . . . ).

Due to the mobile nature of access terminals in general, an access terminal can move from being under coverage of a first base station (e.g., source base station, . . . ) to a second base station (e.g., target base station, . . . ). Accordingly, a mobility procedure (e.g., handover, handoff, . . . ) can be effectuated such that the access terminal transitions from being served by a source base station to being served by a target base station. Conventional mobility procedures, however, typically fail to transfer the subset of QoS parameters set by the source base station to the target base station. When employing mobility procedures, the target base station can be provided with the description parameter from the PDN GW, and thus, can identify the type of traffic. Yet, the target base station commonly reconstructs the disparate subset of parameters related to QoS (e.g., previously built by the source base station, . . . ) since such parameters typically fail to be transferred to the target base station from the source base station (e.g., in connection with inter-base station handover, . . . ), which can lead to disruption in traffic, increased exchange of signaling messages over the air, and the like.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating support of Quality of Service (QoS) continuity during an inter-base station mobility procedure. Layer 2 (L2) protocol configuration information for QoS (e.g., uplink, downlink, and/or uplink QoS configuration information set by a source base station can be transmitted via an interface (e.g., X2 interface, . . . ) to a target base station during an inter-base station mobility procedure. Further, the target base station can select whether to reuse at least a portion of the L2 protocol configuration information for QoS and/or uplink QoS configuration information received from the source base station. Moreover, L2 protocol configuration information for QoS and/or uplink QoS configuration information not selected to be reused can be reconstructed.

According to related aspects, a method that facilitates providing Quality of Service (QoS) continuity during a mobility procedure in a wireless communication environment is described herein. The method can include identifying Layer 2 (L2) protocol configuration information for Quality of Service (QoS) set by a source base station. Further, the method can include transmitting the L2 protocol configuration information for QoS to a target base station from the source base station over an interface during an inter-base station mobility procedure.

Another aspect relates to a wireless communications apparatus. The wireless communications apparatus can include a memory that retains instructions related to initializing Layer 2 (L2) protocol configuration information for Quality of Service (QoS) per radio bearer, and transferring the L2 protocol configuration information for QoS to a target base station via an X2 interface during an inter-base station mobility procedure. Further, the wireless communications apparatus can include a processor, coupled to the memory, configured to execute the instructions retained in the memory.

Yet another aspect relates to a wireless communications apparatus that enables supporting Quality of Service (QoS) continuity in a wireless communication environment. The wireless communications apparatus can include means for initializing Layer 2 (L2) protocol configuration information for Quality of Service (QoS) at a source base station. Moreover, the wireless communications apparatus can include means for transferring the L2 protocol configuration information for QoS initialized at the source base station to a target base station via an interface during an inter-base station mobility procedure.

Still another aspect relates to a computer program product that can comprise a computer-readable medium. The computer-readable medium can include code stored on the medium for initializing Layer 2 (L2) protocol configuration information for Quality of Service (QoS) at a source base station. Further, the computer-readable medium can comprise code stored on the medium for sending the L2 protocol configuration information for QoS initialized at the source base station to a target base station via an X2 interface during an inter-base station handover.

In accordance with another aspect, an apparatus in a wireless communication system can include a processor, wherein the processor can be configured to recognize Layer 2 (L2) protocol configuration information for Quality of Service (QoS) set by a source base station. Further, the processor can be configured to recognize uplink QoS configuration information set by the source base station. Moreover, the processor can be configured to transmit the L2 protocol configuration information for QoS and the uplink QoS configuration information to a target base station from the source base station over an X2 interface during an inter-base station mobility procedure.

According to other aspects, a method that facilitates maintaining Quality of Service (QoS) during a mobility procedure in a wireless communication environment is described herein. The method can include receiving Layer 2 (L2) protocol configuration information for Quality of Service (QoS) set by a source base station from the source base station via an interface during an inter-base station mobility procedure. Further, the method can comprise selecting whether to reuse at least a portion of the received L2 protocol configuration information for QoS. Moreover, the method can include reconstructing a remainder of the L2 protocol configuration information for QoS that fails to be selected to be reused.

Yet another aspect relates to a wireless communications apparatus that can include a memory that retains instructions related to obtaining Layer 2 (L2) protocol configuration information for Quality of Service (QoS) set by a source base station from the source base station via an X2 interface during an inter-base station handover, choosing whether to reuse at least a portion of the obtained L2 protocol configuration information for QoS, and rebuilding a remainder of the L2 protocol configuration information for QoS that fails to be chosen to be reused. Further, the wireless communications apparatus can comprise a processor, coupled to the memory, configured to execute the instructions retained in the memory.

Another aspect relates to a wireless communications apparatus that enables maintaining Quality of Service (QoS) through a mobility procedure in a wireless communication environment. The wireless communications apparatus can include means for obtaining Layer 2 (L2) protocol configuration information for Quality of Service (QoS) from a source base station via an interface during an inter-base station mobility procedure. Moreover, the wireless communications apparatus can include means for determining whether to reuse at least a portion of the obtained L2 protocol configuration information for QoS. Further, the wireless communications apparatus can include means for utilizing the L2 protocol configuration information obtained from the base station determined to be reused.

Still another aspect relates to a computer program product that can comprise a computer-readable medium. The computer-readable medium can include code stored on the medium for obtaining Layer 2 (L2) protocol configuration information for Quality of Service (QoS) from a source base station via an interface during an inter-base station mobility procedure. Further, the computer-readable medium can include code stored on the medium for determining whether to reuse at least a subset of the obtained L2 protocol configuration information for QoS. Moreover, the computer-readable medium can include code stored on the medium for utilizing the L2 protocol configuration information obtained from the base station determined to be reused. The computer-readable medium can also include code stored on the medium for rebuilding the L2 protocol configuration information determined to not be reused.

In accordance with another aspect, an apparatus in a wireless communication system can include a processor, wherein the processor can be configured to receive at least one of uplink Layer 2 (L2) protocol configuration information for Quality of Service (QoS), downlink L2 protocol configuration information for QoS, or QoS configuration information from a source base station over an X2 interface during an inter-base station mobility procedure. Moreover, the processor can be configured to select whether to reuse the at least one of uplink Layer 2 (L2) protocol configuration information for Quality of Service (QoS), downlink L2 protocol configuration information for QoS, or QoS configuration information received from the source base station.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
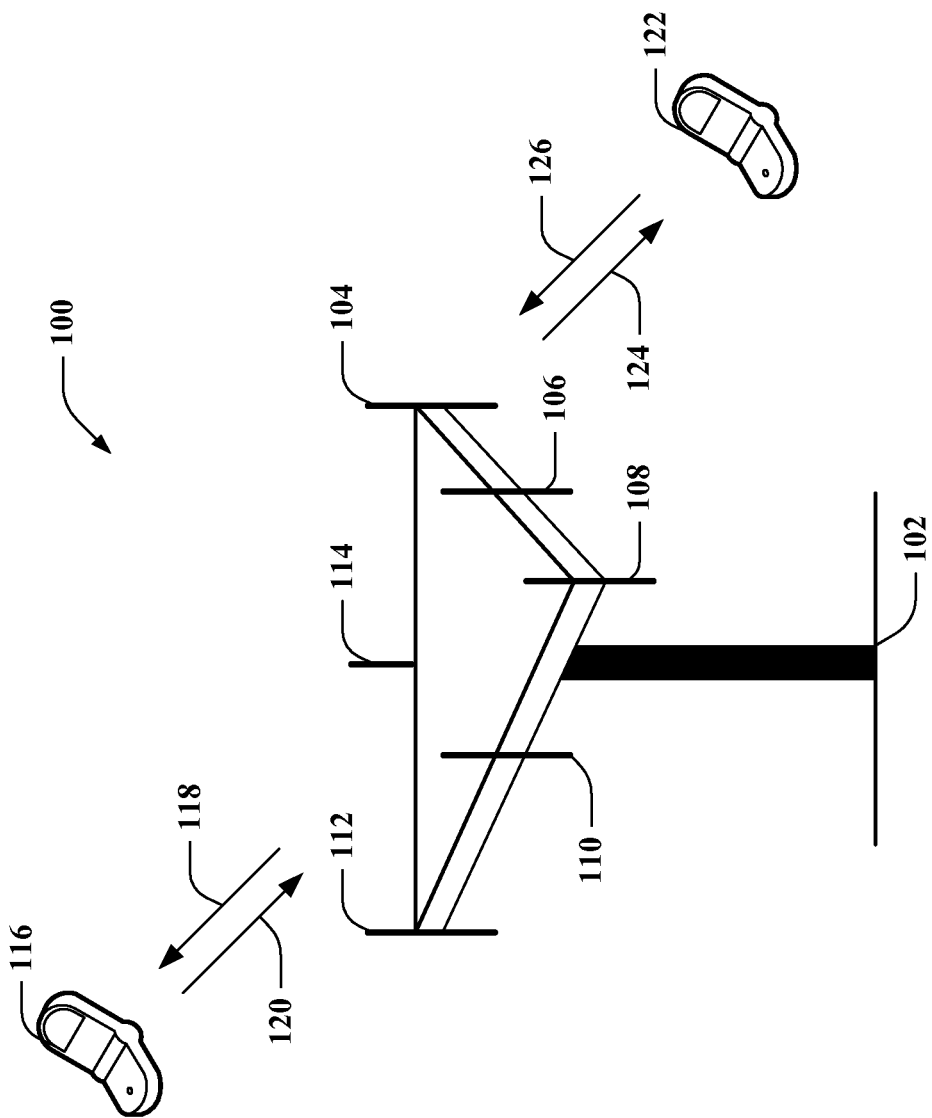
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB, eNB) or some other terminology.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 enables providing Quality of Service (QoS) continuity in connection with a mobility procedure (e.g., handover, handoff, . . . ) in a wireless communication environment. More particularly, for inter-base station handover, base station 102 can send Layer 2 (L2) protocol configuration information for QoS to a disparate base station (not shown) and/or receive L2 protocol configuration information for QoS from the disparate base station. The L2 protocol configuration information can be uplink L2 protocol configuration information and/or downlink L2 protocol configuration information. Further, uplink QoS configuration information can additionally or alternatively be transferred between base station 102 and the disparate base station. The L2 protocol configuration information and/or the uplink QoS configuration information can be exchanged between base station 102 and the disparate base station via an interface (e.g., X2 interface, . . . ).

According to an illustration, base station 102 can be a source base station that can serve an access terminal (e.g., access terminal 116, access terminal 122, . . . ) prior to handover to the disparate base station. Following this illustration, base station 102 can obtain a description parameter (e.g., QoS Class Index (QCI), . . . ) from a core network (e.g., Packet Data Network Gateway (PDN GW), . . . ) that identifies a type of traffic. Further, base station 102 can configure various parameters related to QoS. During an inter-base station mobility procedure, base station 102 can transfer the parameters related to QoS to a target base station (not shown) via an interface (e.g., X2 interface, . . . ). Accordingly, the target base station can employ the parameters related to QoS, thereby minimizing the exchange of signaling messages over the air while maintaining QoS through the mobility procedure (e.g., before, during, and after the mobility procedure, . . . ).

By way of a further example, base station 102 can be a target base station that can serve an access terminal (e.g., access terminal 116, access terminal 122, . . . ) after a handover from a disparate base station. For instance, base station 102 can obtain parameters related to QoS configured by a source base station (not shown) from such source base station via an interface (e.g., X2 interface, . . . ). Further, base station 102 can evaluate whether to reuse the received parameters related to QoS (or a subset thereof) or rebuild parameters related to QoS (or a subset thereof). By reusing the received parameters related to QoS, disruption in traffic and/or over the air signaling can be mitigated in connection with inter-base station mobility procedures.

Figure 2:
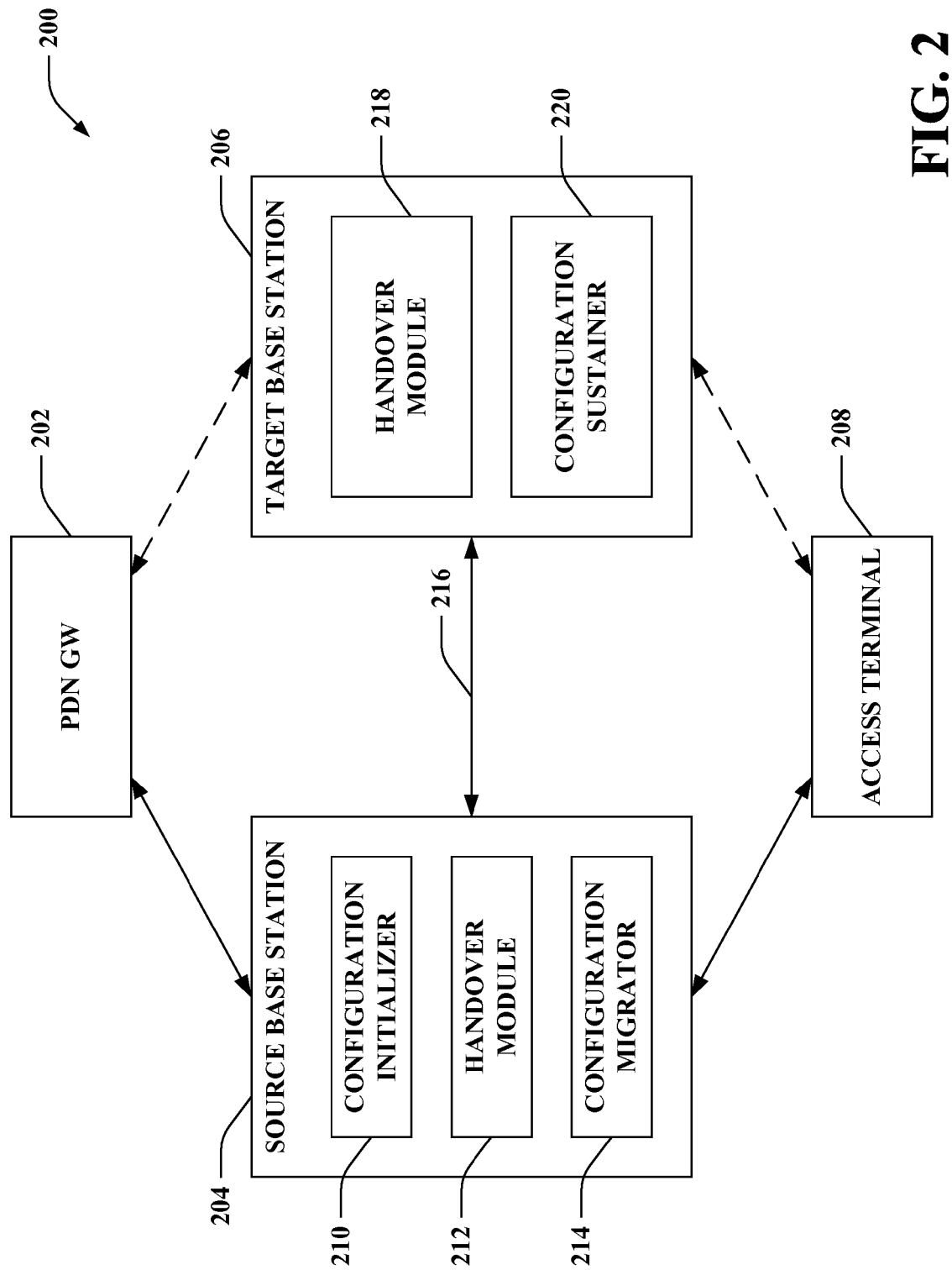
FIG. 2 is an illustration of an example system that provides QoS continuity in a wireless communication environment.

Referring to FIG. 2, illustrated is a system 200 that provides QoS continuity in a wireless communication environment. System 200 includes a Packet Data Network Gateway (PDN GW) 202, a source base station 204, a target base station 206, and an access terminal 208. PDN GW 202 can interface with external Packet Data Network(s) (PDN(s)) (not shown) (e.g., Internet, IP multimedia subsystem (IMS), . . . ). PDN GW 202, for instance, can handle address allocation, policy enforcement, packet classification and routing, and so forth. Moreover, source base station 204 and target base station 206 can transmit and/or receive information, signals, data, instructions, commands, bits, symbols, and the like. It is to be appreciated that the term base station can also be referred to as an access point, Node B, Evolved Node B (eNodeB, eNB) or some other terminology. Further, access terminal 208 can transmit and/or receive information, signals, data, instructions, commands, bits, symbols, and the like. Moreover, although not shown, it is contemplated that any number of base stations similar to source base station 204 and/or target base station 206 can be included in system 200 and/or any number of access terminals similar to access terminal 208 can be included in system 200. Also, although not depicted, it is to be appreciated that source base station 204 and target base station 206 can be substantially similar. According to an illustration, system 200 can be a Long Term Evolution (LTE) based system; however, the claimed subject matter is not so limited.

A virtual connection can be established between two endpoints in system 200; in particular, such virtual connection can be formed between PDN GW 202 and access terminal 208 (e.g., PDN GW 202 or access terminal 208 can trigger establishment of the virtual connection, . . . ). The virtual connection can be referred to as an evolved packet system (EPS) bearer, and can include a plurality of intermediate nodes (e.g., base station, Serving Gateway (S-GW), . . . ).

Each EPS bearer can provide a bearer service and can be associated with specific QoS attributes. The QoS attributes corresponding to a given EPS bearer can be at least partially described by a QoS Class Index (QCI), which indicates a type of service that utilizes such virtual connection.

Further, each EPS bearer can include a radio bearer; thus, a one-to-one mapping between EPS bearers and radio bearers can be leveraged (e.g., before, during, and after a mobility procedure, . . . ). A radio bearer (RB) can be an information path of defined capacity, delay, bit error rate, etc. A radio bearer can be associated with the over the air connection pertaining to a corresponding EPS bearer between source base station 204 and access terminal 208 (or between target base station 206 and access terminal 208). Further, for instance, a radio bearer can correspond to a logical channel.

According to an illustration, a mobility procedure (e.g., handover, handoff, . . . ) between base stations can be effectuated. Following this illustration, access terminal 208 can be served by source base station 204 (e.g., source base station 204 can be an intermediate node associated with one or more EPS bearers between PDN GW 202 and access terminal 208, . . . ). A mobility procedure can be triggered (e.g., based upon a radio measurement obtained by source base station 204 from access terminal 208, . . . ), which can cause a transition to target base station 206 serving access terminal 208 (e.g., target base station 206 can replace source base station 204 as an intermediate node associated with at least one of the one or more EPS bearers between PDN GW 202 and access terminal 208, . . . ). For instance, the mobility procedure can be effectuated in response to access terminal 208 moving from being under coverage of source base station 204 to being under coverage of target base station 206. Further, it is to be appreciated that the definition of EPS bearers between PDN GW 202 and access terminal 208 can remain unaltered (e.g., by PDN GW 202, . . . ) during the inter-base station mobility procedure.

Source base station 204 can further include a configuration initializer 210, a handover module 212, and a configuration migrator 214. Configuration initializer 210 can configure parameters related to QoS for utilization in connection with uplink and/or downlink transmissions. According to an example, configuration initializer 210 can set parameters related to QoS based upon a traffic type indicated by PDN GW 202. PDN GW 202 can generally describe the traffic type and can allow source base station 204 to configure the parameters related to QoS based thereupon. For instance, configuration initializer 210 can yield Layer 2 (L2) protocol configuration information for QoS. The L2 protocol configuration information can include Packet Data Convergence Protocol (PDCP) parameters, Radio Link Control (RLC) parameters, Hybrid Automatic Repeat-Request (HARQ) parameters, Medium Access Control (MAC) parameters, a combination thereof, and so forth for each radio bearer. The L2 protocol configuration information can include uplink L2 protocol configuration information and/or downlink L2 protocol configuration information. Moreover, configuration initializer 210 can set QoS parameters such as logical channel priority, Prioritized Bit Rate (PBR), Maximum Bit Rate (MBR), Guaranteed Bit Rate (GBR), a combination thereof, and the like. The QoS parameters generated by configuration initializer 210 can include uplink QoS parameters and/or downlink QoS parameters.

Further, handover module 212 can prepare target base station 206 and/or access terminal 208 for a mobility procedure (e.g., handover, handoff, . . . ) from source base station 204 to target base station 206. Handover module 212, for instance, can forward data queued for transmission, timing information or other synchronization data, acknowledgement or re-transmission data, and/or any other information suitable for aiding a transition from source base station 204 to target base station 206. Further, handover module 212 can discontinue a connection between source base station 204 and access terminal 208 upon handing off to target base station 206.

Moreover, configuration migrator 214 can send parameters related to QoS set by source base station 204 (or a disparate base station if an inter-base station mobility procedure was previously effectuated) to target base station 206. Configuration migrator 214 can transfer the parameters related to QoS configured by source base station 204 over an interface (e.g., an X2 interface 216, . . . ). X2 interface 216 can be an interface for the interconnection of two base stations (e.g., source base station 204 and target base station 206, . . . ) within an Evolved Universal Terrestrial Radio Access Network (E-UTRAN) architecture. X2 interface 216 can support exchange of signaling information between source base station 204 and target base station 206. Further, X2 interface 216 can support forwarding of packet data units (PDUs) to respective tunnel endpoints. Moreover, from a logical standpoint, X2 interface 216 can be a point-to-point interface between source base station 204 and target base station 206 within E-UTRAN; however, direct physical connection between source base station 204 and target base station 206 need not be leveraged for such logical point-to-point X2 interface 216.

Target base station 206 can further include a handover module 218 and a configuration sustainer 220. Handover module 218 can prepare target base station 206 for the mobility procedure. Handover module 218 can obtain information related to the mobility procedure from source base station 204 (e.g., forwarded by handover module 212, . . . ). Such information can include, for example, data queued for transmission, timing information or other synchronization data, acknowledgement or re-transmission data, and/or any other information suitable for aiding the transition. Further, handover module 218 can establish a connection between target base station 206 and access terminal 208.

Configuration sustainer 220 can receive and utilize parameters related to QoS configured by source base station 204 and sent over X2 interface 216. Pursuant to an example, configuration migrator 214 (e.g., source base station 204, . . . ) can transfer parameters related to QoS set by source base station 204 to configuration sustainer 220 (e.g., target base station 204, . . . ) via X2 interface 216. The parameters related to QoS configured by source base station 204 can include uplink L2 protocol configuration information, downlink L2 protocol configuration information, and/or uplink QoS parameters. Configuration sustainer 220 can reuse the received parameters related to QoS set by source base station 204. By reusing such parameters, reconstruction of parameters (or a portion thereof) need not be effectuated by target base station 206; thus, QoS continuity during inter-base station handover can be enhanced while over the air signaling can be reduced. In contrast, conventional techniques typical rebuild parameters related to QoS with target base station 206, which can lead to disruption in traffic, potential changes in QoS, and so forth.

Figure 3:
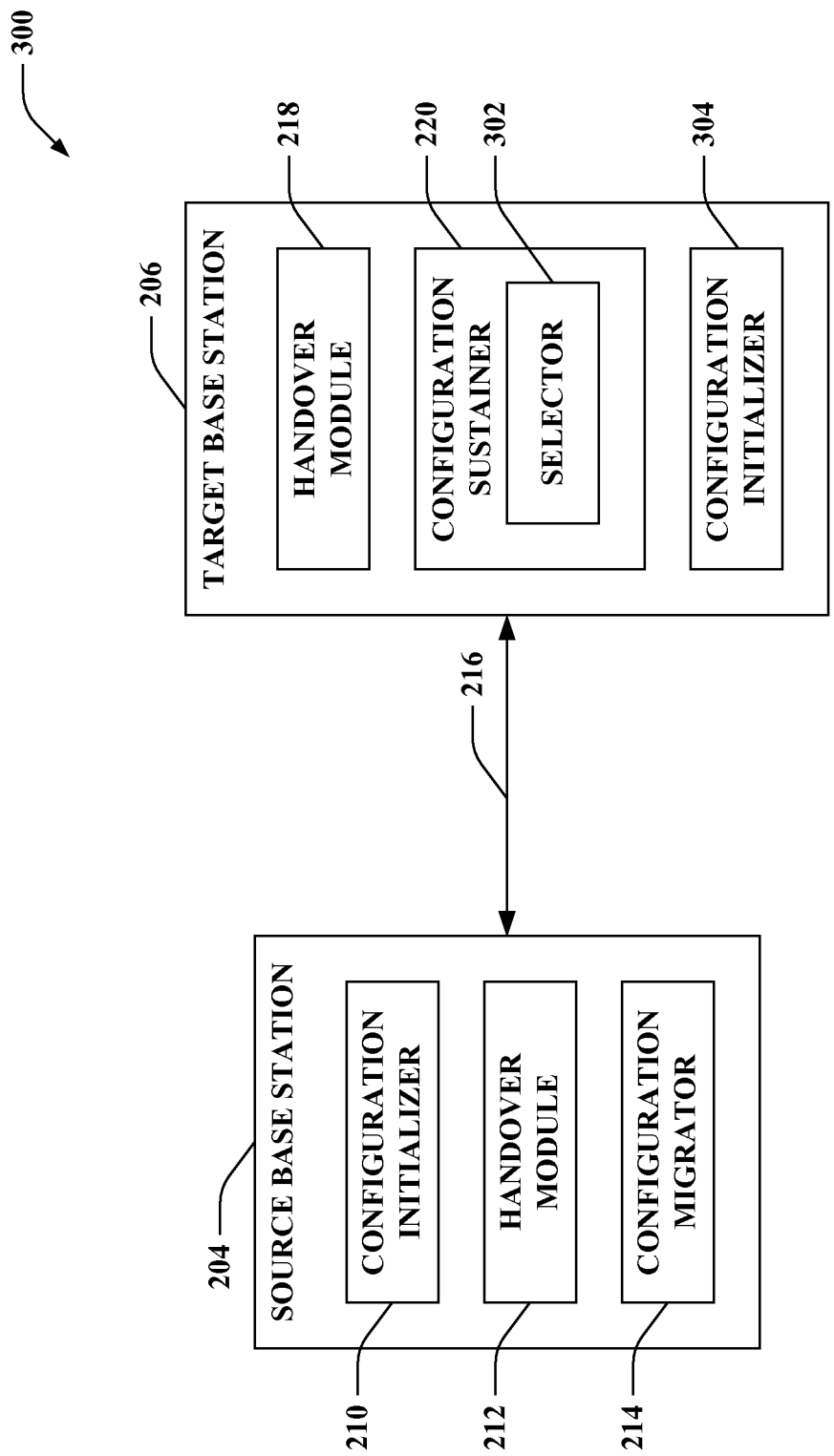
FIG. 3 is an illustration of an example system that exchanges parameters related to QoS between base stations over an interface in a wireless communication environment.

Now turning to FIG. 3, illustrated is a system 300 that exchanges parameters related to QoS between base stations over an interface in a wireless communication environment. System 300 includes source base station 204 and target base station 206. Source base station 204 can include configuration initializer 210, handover module 212, and configuration migrator 214 as described herein. Target base station 206 can include handover module 218 and configuration sustainer 220 as described herein. Further, source base station 204 and target base station 206 can exchange parameters related to QoS via X2 interface 216.

Moreover, configuration sustainer 220 of target base station 206 can further include a selector 302 that can evaluate parameters related to QoS built by source base station 204 and received via X2 interface 216. Additionally or alternatively, selector 302 can analyze target base station 206 and source base station 204 (e.g., compare vendors of such base stations, . . . ). Based upon the foregoing, selector 302 can elect whether to utilize the received parameters related to QoS configured by source base station 204 (or a subset thereof).

Target base station 206 can further include configuration initializer 304, which can be substantially similar to configuration initializer 210 of source base station 204. When selector 302 determines to forego employing parameters related to QoS set by source base station 204, configuration initializer 304 can rebuilt such parameters (e.g., based upon traffic type information obtained from a PDN GW, . . . ).

On the downlink, QoS can be provided to bearers of a single access terminal through various mechanisms. These mechanisms can include one-to-one mapping between EPS bearers and radio bearers. Further, the mechanisms can include configuration of PDCP, RLC, HARQ, and MAC parameters (e.g., downlink L2 protocol configuration information, . . . ) for each radio bearer. Moreover, the mechanisms can include application of base station scheduler policies to prioritize between different bearers of a single access terminal.

For example, configuration of downlink L2 protocols (e.g., PDCP, RLC, HARQ, MAC, . . . ) can be base station specific, and different base station vendors can employ different techniques for providing the parameters related to QoS based upon information obtained from a PDN GW. Moreover, application of base station scheduler policies can be different from vendor to vendor. Further, the base station scheduler policies can relate to the configuration of L2 protocols. Accordingly, different base station vendors can implement different schedulers, which can result in different L2 configurations. Given that the configuration of L2 protocols and scheduler policies can be decided at the base station and can be dependent upon each other, during inter-base station handover between different base station vendors, the downlink L2 parameters can be rebuilt (e.g., potentially yielding disruption in the treatment of radio bearers, . . . ). Thus, selector 302 can recognize an inter-base station handover between base stations from different vendors, and hence, can elect for configuration initializer 304 to reconstruct the L2 parameters.

Pursuant to another example, for inter-base station handovers between base stations with a common base station vendor, scheduler policies can be similar, which can result in similar L2 protocol configurations. In such case, selector 302 can elect to employ the L2 protocol configuration information obtained from source base station 204 via X2 interface 216 rather than rebuild such parameters (e.g., with configuration initializer 304, . . . ).

Thus, to handle the aforementioned examples using a common procedure that can minimize disruption of downlink QoS before and after inter-base station handover, source base station 204 can communicate downlink L2 configuration information to target base station 206 (e.g., over X2 interface 216, . . . ). Target base station 206 (e.g., selector 302, . . . ) can then decide to reuse or not reuse the downlink L2 protocols as configured by source base station 204 for an access terminal.

On the uplink, QoS can be provided to the bearers of a single access terminal through various mechanisms. The mechanisms can include one-to-one mapping between EPS bearers and radio bearers. Further, the mechanisms can include configuration of PDCP, RLC, HARQ, and MAC parameters (e.g., uplink L2 protocol configuration information, . . . ) for each radio bearer. Moreover, the mechanisms can include configuration of uplink QoS configuration information such as, for example, logical channel priority, Prioritized Bit Rate (PBR), Maximum Bit Rate (MBR), Guaranteed Bit Rate (GBR), etc.

The configuration of uplink L2 protocols can be handled in a substantially similar manner as compared to the downlink L2 protocols as described above. Further, uplink QoS configuration of logical channel priority, PBR, MBR, GBR, and the like can be standardized, and can be treated in a substantially similar manner as compared to downlink L2 protocol configuration information. Thus, during inter-base station handover, source base station 204 can communicate uplink L2 protocol configuration information and QoS configuration information (e.g., logical channel priority, PBR, MBR, GBR, . . . ) to target base station 206 (e.g., over X2 interface 216, . . . ). Therefore, selector 302 can decipher whether to reuse the uplink L2 protocol configuration information (or a subset thereof) and/or the uplink QoS configuration information obtained from source base station 204. Moreover, configuration initializer 304 can reconstruct uplink L2 protocol configuration information and/or uplink QoS configuration information chosen to not be reused by selector 302.

Various information pertaining to L2 configuration can be sent from source base station 204 to target base station 206. An example of a PDCP parameter that can be exchanged is a Robust Header Compression (ROHC) profile employed by source base station 204. According to another illustration, an RLC parameter that can be communicated can be an indicator corresponding to an RLC mode (e.g., acknowledged mode, unacknowledged mode, . . . ) utilized by source base station 204. Moreover, if acknowledged mode is utilized, the L2 configuration information sent via X2 interface 216 can further include a number of rounds of negative acknowledgements (NAKs), a type of timer to use when evaluating whether a packet is lost, a manner by which an access terminal is polled to ask for reports, and so forth. Further, if unacknowledged mode is employed, the L2 configuration information transferred over X2 interface 216 can pertain to a length of time during which a user or packet has been unable to be scheduled. Pursuant to a further example, a MAC parameter that can be exchanged can be an indicator that specifies a type of scheduling (e.g., dynamic, semi-persistent, . . . ) that is utilized by source base station 204.

Figure 4:
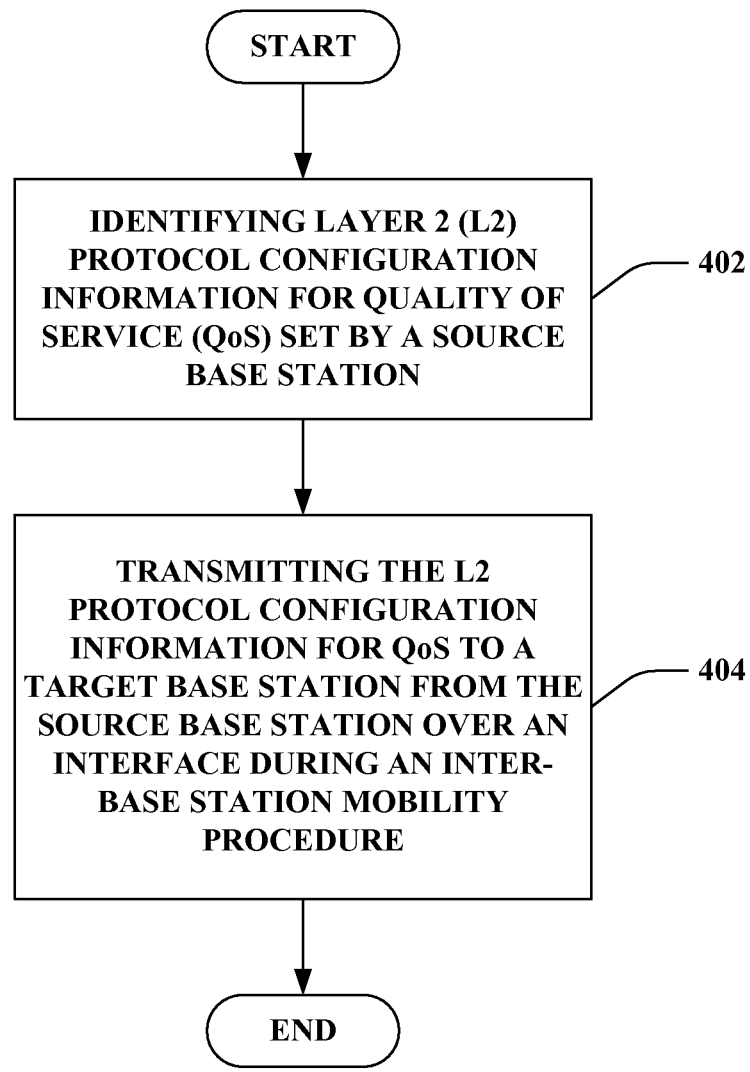
FIG. 4 is an illustration of an example methodology that facilitates providing Quality of Service (QoS) continuity during a mobility procedure in a wireless communication environment.
Figure 5:
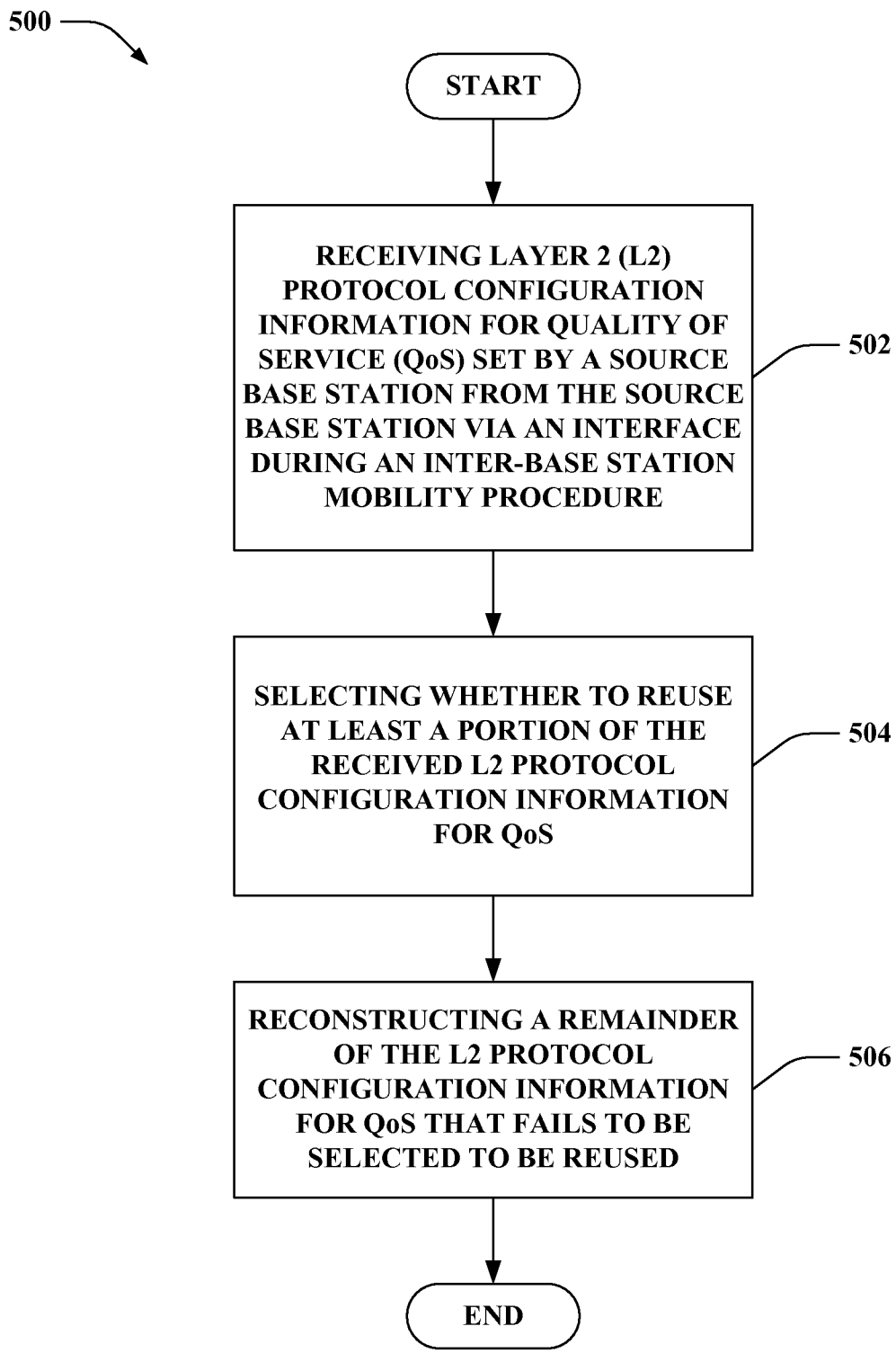
FIG. 5 is an illustration of an example methodology that facilitates maintaining Quality of Service (QoS) during a mobility procedure in a wireless communication environment.

Referring to FIGS. 4-5, methodologies relating to providing QoS continuity during a mobility procedure in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 4, illustrated is a methodology 400 that facilitates providing Quality of Service (QoS) continuity during a mobility procedure in a wireless communication environment. At 402, Layer 2 (L2) protocol configuration information for Quality of Service (QoS) set by a source base station can be identified. For instance, the L2 protocol configuration information for QoS can include uplink L2 protocol configuration information. According to another example, the L2 protocol configuration information can include downlink L2 protocol configuration information. Further, the L2 protocol configuration information for QoS can be initialized and/or controlled by the source base station per radio bearer. Moreover, the L2 protocol configuration information for QoS can include Packet Data Convergence Protocol (PDCP) parameters, Radio Link Control (RLC) parameters, Hybrid Automatic Repeat-Request (HARQ) parameters, Medium Access Control (MAC) parameters, a combination thereof, and so forth for each radio bearer. Pursuant to a further example, uplink QoS configuration information set by the source base station can be recognized. The uplink QoS configuration information can include, for instance, logical channel priority, Prioritized Bit Rate (PBR), Maximum Bit Rate (MBR), Guaranteed Bit Rate (GBR), a combination thereof, and the like.

At 404, the L2 protocol configuration information for QoS can be transmitted to a target base station from the source base station over an interface during an inter-base station mobility procedure. The interface, for instance, can be an X2 interface. According to a further example, uplink QoS configuration information set by the source base station can additionally or alternatively be transmitted to the target base station over the interface during the inter-base station mobility procedure.

Now turning to FIG. 5, illustrated is a methodology 500 that facilitates maintaining Quality of Service (QoS) during a mobility procedure in a wireless communication environment. At 502, Layer 2 (L2) protocol configuration information for Quality of Service (QoS) set by a source base station can be received from the source base station via an interface during an inter-base station mobility procedure. The interface, for instance, can be an X2 interface. Further, the L2 protocol configuration information can include uplink L2 protocol configuration information and/or downlink L2 protocol configuration information. Moreover, the L2 protocol configuration information can be configured by the source base station per radio bearer. The L2 protocol configuration information for QoS can include Packet Data Convergence Protocol (PDCP) parameters, Radio Link Control (RLC) parameters, Hybrid Automatic Repeat-Request (HARQ) parameters, Medium Access Control (MAC) parameters, a combination thereof, and so forth for each radio bearer. According to another example, uplink QoS configuration information set by the source base station can additionally or alternatively be received from the source base station via the interface during the inter-base station mobility procedure. The uplink QoS configuration information can include, for instance, logical channel priority, Prioritized Bit Rate (PBR), Maximum Bit Rate (MBR), Guaranteed Bit Rate (GBR), a combination thereof, and the like.

At 504, a selection can be effectuated concerning whether to reuse at least a portion of the received L2 protocol configuration information for QoS. According to another example, a selection can be performed related to whether to reuse at least a portion of the received uplink QoS configuration information. Moreover, the received L2 protocol configuration information for QoS and/or the received uplink QoS configuration information selected for reuse can be employed when communicating with an access terminal over the uplink and/or downlink. Pursuant to an illustration, the selection can be based upon a comparison of vendors for the source base station and a target base station.

At 506, a remainder of the L2 protocol configuration information for QoS that fails to be selected to be reused can be reconstructed. Additionally or alternatively, a remainder of the uplink QoS configuration information that fails to be selected to be reused can be reconstructed.

It will be appreciated that, in accordance with one or more aspects described herein, inferences can be made regarding maintaining QoS continuity in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting L2 protocol configuration information and/or uplink QoS configuration information to exchange over an interface during an inter-base station mobility procedure. By way of further illustration, an inference can be made related to determining whether to reuse or rebuild L2 protocol configuration information and/or uplink QoS configuration information. It will be appreciated that the foregoing examples are illustrative in nature and are not intended to limit the number of inferences that can be made or the manner in which such inferences are made in conjunction with the various embodiments and/or methods described herein.

Figure 6:
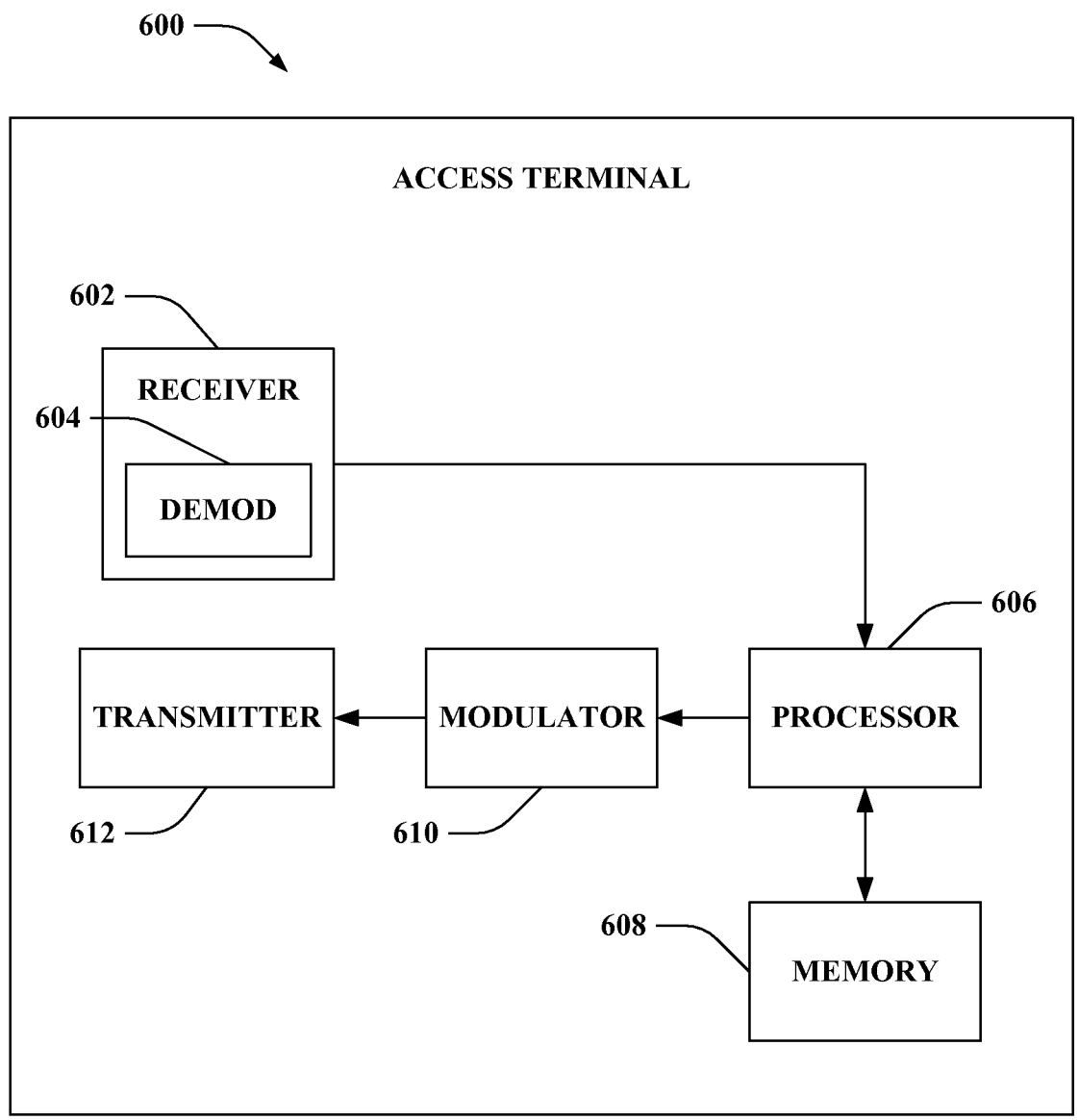
FIG. 6 is an illustration of an example access terminal that can be employed in connection with various aspects of the claimed subject matter.

FIG. 6 is an illustration of an access terminal 600 that can be employed in connection with various aspects of the claimed subject matter. Access terminal 600 comprises a receiver 602 that receives a signal from, for instance, a receive antenna (not shown), and performs typical actions thereon (e.g., filters, amplifies, downconverts, etc.) the received signal and digitizes the conditioned signal to obtain samples. Receiver 602 can be, for example, an MMSE receiver, and can comprise a demodulator 604 that can demodulate received symbols and provide them to a processor 606 for channel estimation. Processor 606 can be a processor dedicated to analyzing information received by receiver 602 and/or generating information for transmission by a transmitter 612, a processor that controls one or more components of access terminal 600, and/or a processor that both analyzes information received by receiver 602, generates information for transmission by transmitter 612, and controls one or more components of access terminal 600.

Access terminal 600 can additionally comprise memory 608 that is operatively coupled to processor 606 and that can store data to be transmitted, received data, and any other suitable information related to performing the various actions and functions set forth herein.

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Access terminal 600 still further comprises a modulator 610 and a transmitter 612 that transmits data, signals, etc. to a base station. Although depicted as being separate from the processor 606, it is to be appreciated that modulator 610 can be part of processor 606 or a number of processors (not shown).

Figure 7:
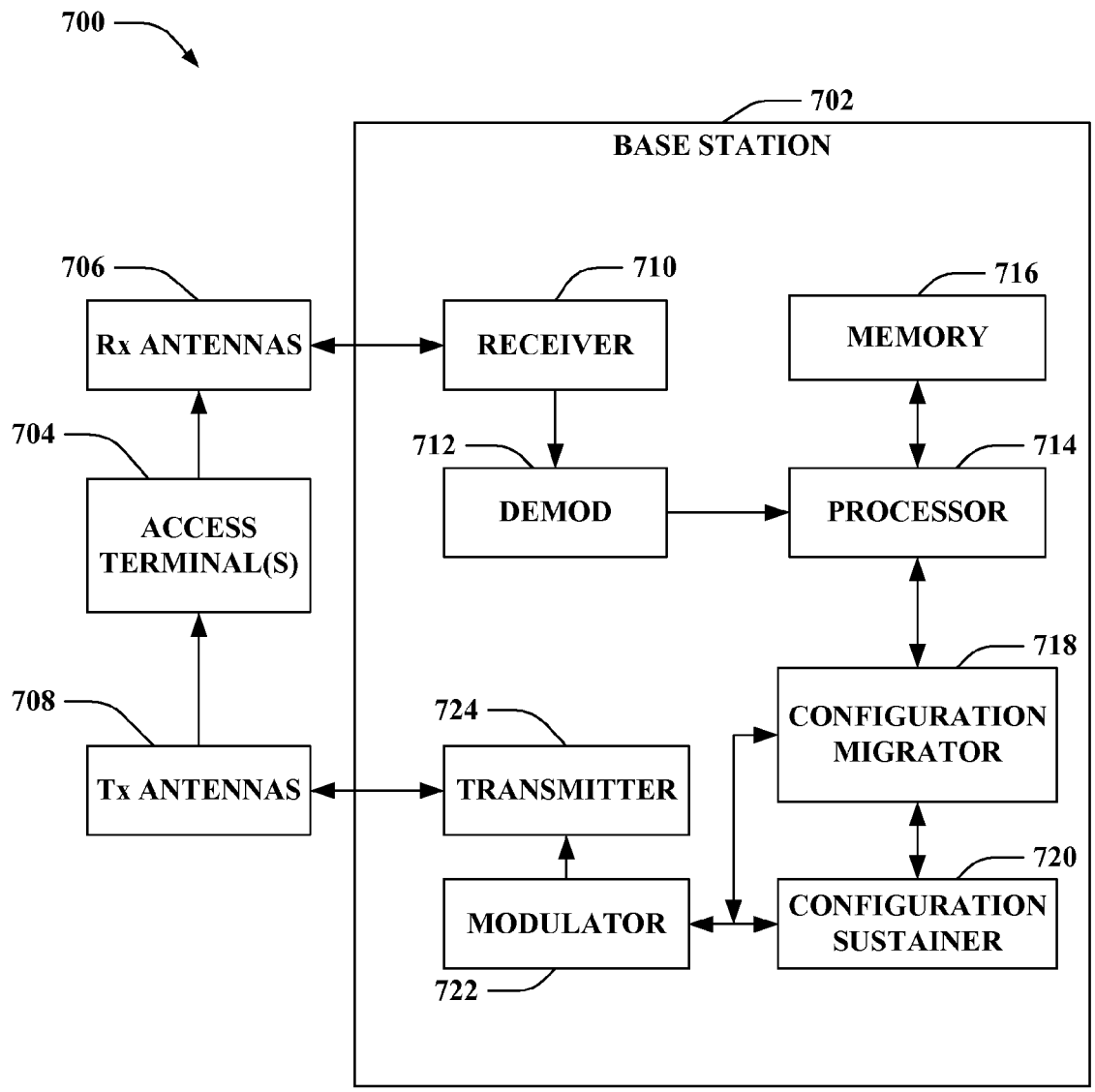
FIG. 7 is an illustration of an example system that maintains QoS continuity during a mobility procedure in a wireless communication environment.

FIG. 7 is an illustration of a system 700 that maintains QoS continuity during a mobility procedure in a wireless communication environment. System 700 comprises a base station 702 (e.g., access point, ...) with a receiver 710 that receives signal(s) from one or more access terminals 704 through a plurality of receive antennas 706, and a transmitter 724 that transmits to the one or more access terminals 704 through a transmit antenna 708. Receiver 710 can receive information from receive antennas 706 and is operatively associated with a demodulator 712 that demodulates received information. Demodulated symbols are analyzed by a processor 714 that can be similar to the processor described above with regard to FIG. 6, and which is coupled to a memory 716 that stores data to be transmitted to or received from access terminal(s) 704 and/or any other suitable information related to performing the various actions and functions set forth herein. Processor 714 is further coupled to a configuration migrator 718 that can transfer uplink and/or downlink L2 protocol configuration information and/or uplink QoS configuration information to a disparate base station (not shown). Moreover, base station 702 can include a configuration sustainer 720 that can receive uplink and/or downlink L2 protocol configuration information and/or uplink QoS configuration information set by a disparate base station (not shown) from the disparate base station. Configuration migrator 718 and configuration sustainer 720 can exchange configuration information with a disparate base station via an interface (e.g., X2 interface, ...) (not shown). It is to be appreciated that configuration migrator 718 can be substantially similar to configuration migrator 214 of FIG. 2 and/or configuration sustainer 720 can be substantially similar to configuration sustainer 220 of FIG. 2. Moreover, although not shown, it is contemplated that base station 702 can include a configuration initializer (which can be substantially similar to configuration initializer 210 of FIG. 2 and/or configuration initializer 304 of FIG. 3), a handover module (which can be substantially similar to handover module 212 of FIG. 2 and/or handover module 218 of FIG. 2), and/or a selector (which can be substantially similar to selector 302 of FIG. 3). Base station 702 can further include a modulator 722. Modulator 722 can multiplex a frame for transmission by a transmitter 724 through antennas 708 to access terminal(s) 704 in accordance with the aforementioned description. Although depicted as being separate from the processor 714, it is to be appreciated that delay budget feedback evaluator 718, scheduler 720, and/or modulator 722 can be part of processor 714 or a number of processors (not shown).

Figure 8:
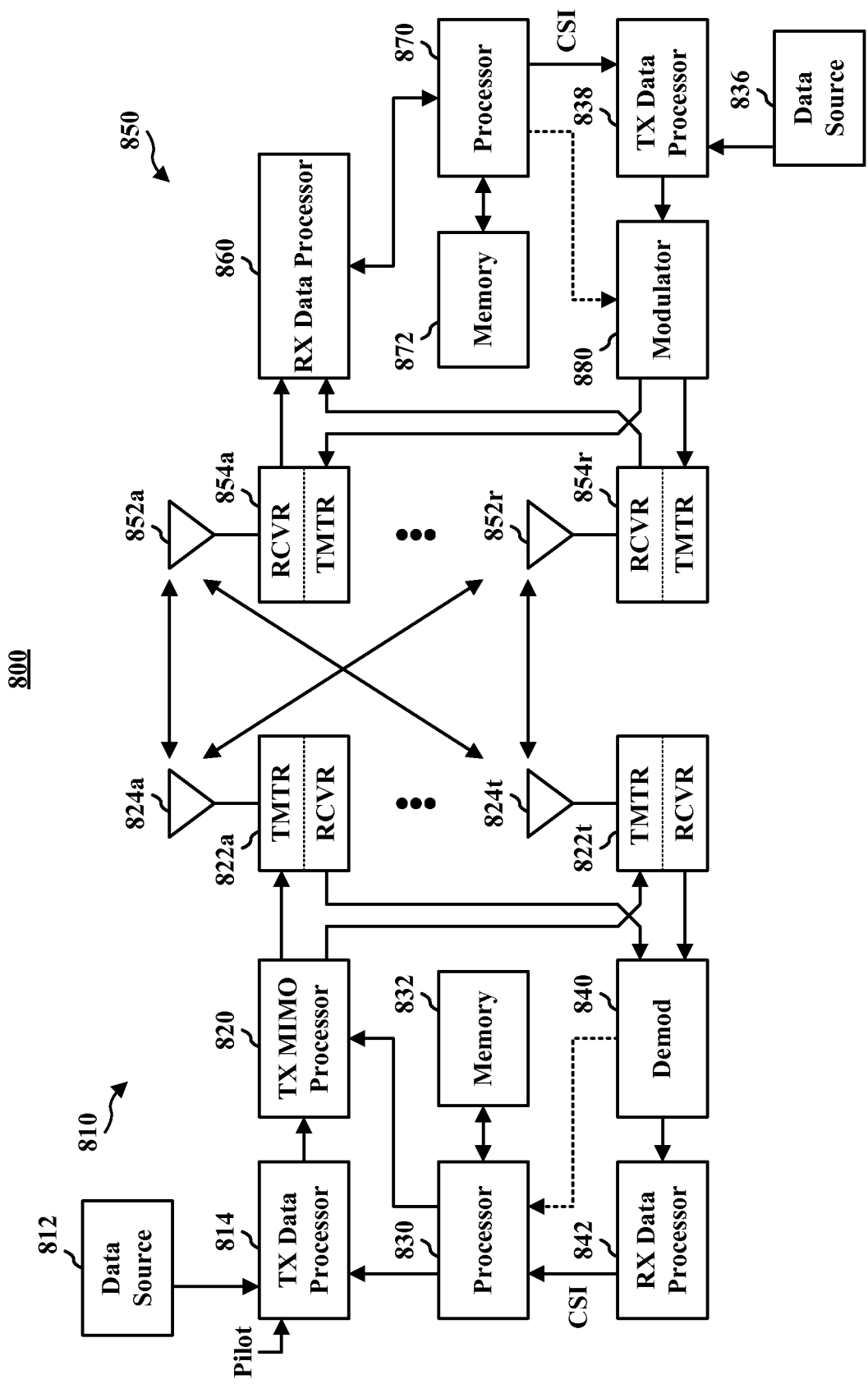
FIG. 8 is an illustration of an example wireless network environment that can be employed in conjunction with the various systems and methods described herein.

FIG. 8 shows an example wireless communication system 800. The wireless communication system 800 depicts one base station 810 and one access terminal 850 for sake of brevity. However, it is to be appreciated that system 800 can include more than one base station and/or more than one access terminal, wherein additional base stations and/or access terminals can be substantially similar or different from example base station 810 and access terminal 850 described below. In addition, it is to be appreciated that base station 810 and/or access terminal 850 can employ the systems (FIGS. 1-3, 6-7, and 9-10) and/or methods (FIGS. 4-5) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At access terminal 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which available technology to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from access terminal 850 are received by antennas 824, conditioned by receivers 822, demodulated by a demodulator 840, and processed by a RX data processor 842 to extract the reverse link message transmitted by access terminal 850. Further, processor 830 can process the extracted message to determine which precoding matrix to use for determining the beamforming weights.

Processors 830 and 870 can direct (e.g., control, coordinate, manage, etc.) operation at base station 810 and access terminal 850, respectively. Respective processors 830 and 870 can be associated with memory 832 and 872 that store program codes and data. Processors 830 and 870 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, ... ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
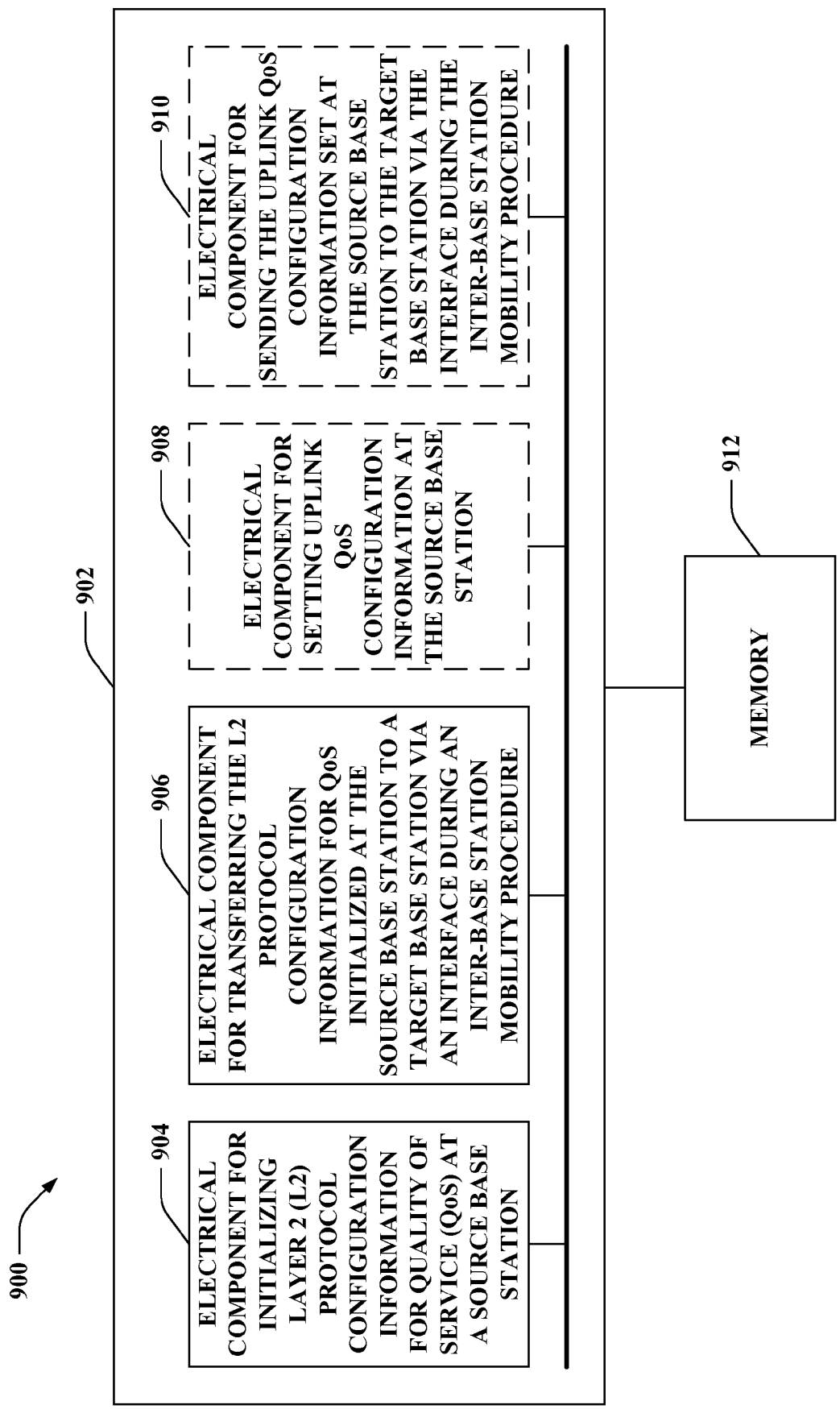
FIG. 9 is an illustration of an example system that enables supporting Quality of Service (QoS) continuity in a wireless communication environment.

With reference to FIG. 9, illustrated is a system 900 that enables supporting Quality of Service (QoS) continuity in a wireless communication environment. For example, system 900 can reside at least partially within a base station. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for initializing Layer 2 (L2) protocol configuration information for Quality of Service (QoS) at a source base station 904. Moreover, logical grouping 902 can include an electrical component for transferring the L2 protocol configuration information for QoS initialized at the source base station to a target base station via an interface during an inter-base station mobility procedure 906. Further, logical grouping 902 can optionally include an electrical component for setting uplink QoS configuration information at the source base station 908. Logical grouping 902 can also optionally include an electrical component for sending the uplink QoS configuration information set at the source base station to the target base station via the interface during the inter-base station mobility procedure 910. Additionally, system 900 can include a memory 912 that retains instructions for executing functions associated with electrical components 904, 906, 908, and 910. While shown as being external to memory 912, it is to be understood that one or more of electrical components 904, 906, 908, and 910 can exist within memory 912.

Figure 10:
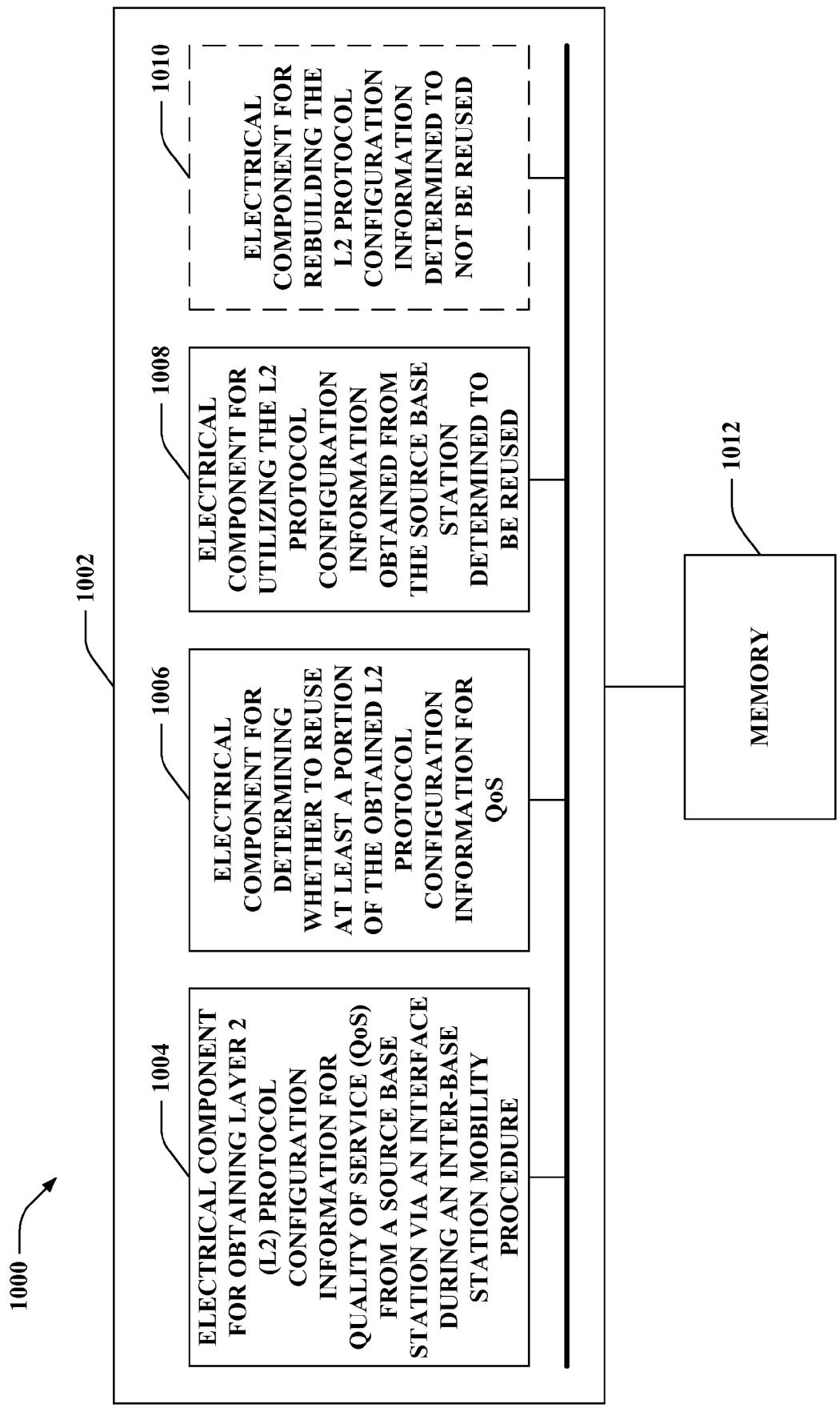
FIG. 10 is an illustration of an example system that enables maintaining Quality of Service (QoS) through a mobility procedure in a wireless communication environment.

With reference to FIG. 10, illustrated is a system 1000 that enables maintaining Quality of Service (QoS) through a mobility procedure in a wireless communication environment. For example, system 1000 can reside at least partially within a base station. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for obtaining Layer 2 (L2) protocol configuration information for Quality of Service (QoS) from a source base station via an interface during an inter-base station mobility procedure 1004. Further, logical grouping 1002 can include an electrical component for determining whether to reuse at least a portion of the obtained L2 protocol configuration information for QoS 1006. Moreover, logical grouping 1002 can include an electrical component for utilizing the L2 protocol configuration information obtained from the source base station determined to be reused 1008. Logical grouping 1002 can also optionally include an electrical component for rebuilding the L2 protocol configuration information determined to not be reused 1010. Additionally, system 1000 can include a memory 1012 that retains instructions for executing functions associated with electrical components 1004, 1006, 1008, and 1010. While shown as being external to memory 1012, it is to be understood that one or more of electrical components 1004, 1006, 1008, and 1010 can exist within memory 1012.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates providing Quality of Service (QoS) continuity during a mobility procedure in a wireless communication environment, comprising:
   identifying Layer 2 (L2) protocol configuration information related to Quality of Service (QoS) set by a source base station, wherein the L2 protocol configuration information is set by the source base station for a radio bearer; and
   transmitting the L2 protocol configuration information related to QoS to a target base station from the source base station over an interface during an inter-base station mobility procedure.

2. The method of claim 1, wherein the L2 protocol configuration information includes downlink L2 protocol configuration information.

3. The method of claim 1, wherein the L2 protocol configuration information includes uplink L2 protocol configuration information.

4. The method of claim 1, further comprising initializing the L2 protocol configuration information related to QoS per radio bearer.

5. The method of claim 1, wherein the L2 protocol configuration information includes at least one of a Packet Data Convergence Protocol (PDCP) parameter, a Radio Link Control (RLC) parameter, a Hybrid Automatic Repeat-Request (HARQ) parameter, or a Medium Access Control (MAC) parameter.

6. The method of claim 1, wherein the interface is an X2 interface.

7. The method of claim 1, further comprising:
   recognizing uplink QoS configuration information set by the source base station; and
   transmitting the uplink QoS configuration information set by the source base station to the target base station over the interface during the inter-base station mobility procedure.

8. The method of claim 7, wherein the QoS configuration information includes one or more of a logical channel priority, a Prioritized Bit Rate (PBR), a Maximum Bit Rate (MBR), or a Guaranteed Bit Rate (GBR).

9. The method of claim 1, wherein the L2 protocol configuration information comprises base station scheduler policies configured to prioritize between different bearers of a single access terminal.

10. The method of claim 1, wherein the L2 protocol configuration information comprises a Robust Header Compression (ROHC) profile.

11. The method of claim 1, wherein the L2 protocol configuration information comprises an indicator corresponding to an RLC mode.

12. A wireless communications apparatus, comprising:
   a memory that retains instructions related to initializing Layer 2 (L2) protocol configuration information related to Quality of Service (QoS) per radio bearer, wherein the L2 protocol configuration information is set by a source base station for a radio bearer, and transferring the L2 protocol configuration information related to QoS from the source base station to a target base station via an X2 interface during an inter-base station mobility procedure; and
   a processor, coupled to the memory, configured to execute the instructions retained in the memory.

13. The wireless communications apparatus of claim 12, wherein the L2 protocol configuration information includes downlink L2 protocol configuration information.

14. The wireless communications apparatus of claim 12, wherein the L2 protocol configuration information includes uplink L2 protocol configuration information.

15. The wireless communications apparatus of claim 12, wherein the L2 protocol configuration information includes at least one of a Packet Data Convergence Protocol (PDCP) parameter, a Radio Link Control (RLC) parameter, a Hybrid Automatic Repeat-Request (HARQ) parameter, or a Medium Access Control (MAC) parameter.

16. The wireless communications apparatus of claim 12, wherein the memory further retains instructions related to setting uplink QoS configuration information, and sending the uplink QoS configuration information to the target base station via the X2 interface during the inter-base station mobility procedure.

17. The wireless communications apparatus of claim 16, wherein the QoS configuration information includes one or more of a logical channel priority, a Prioritized Bit Rate (PBR), a Maximum Bit Rate (MBR), or a Guaranteed Bit Rate (GBR).

18. A wireless communications apparatus that enables supporting Quality of Service (QoS) continuity in a wireless communication environment, comprising:
- means for initializing Layer 2 (L2) protocol configuration information related to Quality of Service (QoS) at a source base station, wherein the L2 protocol configuration information is set by the source base station for a radio bearer; and
- means for transferring the L2 protocol configuration information related to QoS initialized at the source base station to a target base station via an interface during an inter-base station mobility procedure.

19. The wireless communications apparatus of claim 18, wherein the L2 protocol configuration information includes at least one of downlink L2 protocol configuration information or uplink L2 protocol configuration information.

20. The wireless communications apparatus of claim 18, wherein the L2 protocol configuration information includes at least one of a Packet Data Convergence Protocol (PDCP) parameter, a Radio Link Control (RLC) parameter, a Hybrid Automatic Repeat-Request (HARQ) parameter, or a Medium Access Control (MAC) parameter.

21. The wireless communications apparatus of claim 18, further comprising:
- means for setting uplink QoS configuration information at the source base station; and
- means for sending the uplink QoS configuration information set at the source base station to the target base station via the interface during the inter-base station mobility procedure.

22. The wireless communications apparatus of claim 21, wherein the QoS configuration information includes one or more of a logical channel priority, a Prioritized Bit Rate (PBR), a Maximum Bit Rate (MBR), or a Guaranteed Bit Rate (GBR).

23. A computer program product, comprising:
a non-transitory computer-readable medium comprising:
- code stored on the medium for initializing Layer 2 (L2) protocol configuration information related to Quality of Service (QoS) at a source base station, wherein the L2 protocol configuration information is set by the source base station for a radio bearer; and
- code stored on the medium for sending the L2 protocol configuration information related to QoS initialized at the source base station to a target base station via an X2 interface during an inter-base station handover.

24. The computer program product of claim 23, wherein the L2 protocol configuration information includes at least one of a Packet Data Convergence Protocol (PDCP) parameter, a Radio Link Control (RLC) parameter, a Hybrid Automatic Repeat-Request (HARQ) parameter, or a Medium Access Control (MAC) parameter.

25. The computer program product of claim 23, the computer-readable medium further comprising:
- code stored on the medium for initializing uplink QoS configuration information at the source base station; and
- code stored on the medium for sending the uplink QoS configuration information set at the source base station to the target base station via the interface during the inter-base station handover.

26. The computer program product of claim 25, wherein the QoS configuration information includes one or more of a logical channel priority, a Prioritized Bit Rate (PBR), a Maximum Bit Rate (MBR), or a Guaranteed Bit Rate (GBR).

27. In a wireless communication system, an apparatus for wireless communications, comprising:
- a processor; and
- a storage medium coupled to the processor storing codes that when executed by the processor cause the apparatus to:
  - recognize Layer 2 (L2) protocol configuration information related to Quality of Service (QoS) set by a source base station, wherein the L2 protocol configuration information is set by the source base station for a radio bearer;
  - recognize uplink QoS configuration information set by the source base station;
  - and transmit the L2 protocol configuration information for related to QoS and the uplink QoS configuration information to a target base station from the source base station over an X2 interface during an inter-base station mobility procedure.

28. A method that facilitates maintaining Quality of Service (QoS) during a mobility procedure in a wireless communication environment, comprising:
- receiving Layer 2 (L2) protocol configuration information for related to Quality of Service (QoS) set by a source base station from the source base station via an interface during an inter-base station mobility procedure, wherein the L2 protocol configuration information is set by the source base station for a radio bearer;
- selecting whether to reuse at least a portion of the received L2 protocol configuration information related to QoS; and
- reconstructing a remainder of the L2 protocol configuration information related to QoS that fails to be selected to be reused.

29. The method of claim 28, wherein the interface is an X2 interface.

30. The method of claim 28, wherein the L2 protocol configuration information includes at least one of a Packet Data Convergence Protocol (PDCP) parameter, a Radio Link Control (RLC) parameter, a Hybrid Automatic Repeat-Request (HARQ) parameter, or a Medium Access Control (MAC) parameter.

31. The method of claim 28, further comprising selecting whether to reuse at least the portion of the received L2 protocol configuration information related to QoS based upon a comparison of vendors for the source base station and a target base station.

32. The method of claim 28, further comprising employing the received L2 protocol configuration related to QoS selected for reuse when communicating with the access terminal.

33. The method of claim 28, further comprising:
- receiving uplink QoS configuration information set by the source base station from the source base station via the interface during the inter-base station mobility procedure;
- selecting whether to reuse at least a portion of the received QoS configuration information; and
- reconstructing a remainder of the QoS configuration information that fails to be selected to be reused.

34. The method of claim 33, wherein the QoS configuration information includes one or more of a logical channel priority, a Prioritized Bit Rate (PBR), a Maximum Bit Rate (MBR), or a Guaranteed Bit Rate (GBR).

35. The method of claim 28, wherein the L2 protocol configuration information comprises base station scheduler policies configured to prioritize between different bearers of a single access terminal.

36. The method of claim 28, wherein the L2 protocol configuration information comprises a Robust Header Compression (ROHC) profile.

37. The method of claim 28, wherein the L2 protocol configuration information comprises an indicator corresponding to an RLC mode.

38. A wireless communications apparatus, comprising:
- a memory that retains instructions related to obtaining Layer 2 (L2) protocol configuration information related to Quality of Service (QoS) set by a source base station from the source base station via an X2 interface during an inter-base station handover, wherein the L2 protocol configuration information is set by the source base station for a radio bearer, choosing whether to reuse at least a portion of the obtained L2 protocol configuration information related to QoS, and rebuilding a remainder of the L2 protocol configuration information related to QoS that fails to be chosen to be reused; and
- a processor, coupled to the memory, configured to execute the instructions retained in the memory.

39. The wireless communications apparatus of claim 38, wherein the L2 protocol configuration information includes at least one of a Packet Data Convergence Protocol (PDCP) parameter, a Radio Link Control (RLC) parameter, a Hybrid Automatic Repeat-Request (HARQ) parameter, or a Medium Access Control (MAC) parameter.

40. The wireless communications apparatus of claim 38, wherein the memory further retains instructions related to utilizing the received L2 protocol configuration related to QoS chosen for reuse when communicating with the access terminal.

41. The wireless communications apparatus of claim 38, wherein the memory further retains instructions related to obtaining uplink QoS configuration information set by the source base station from the source base station via the X2 interface during the inter-base station handover, choosing whether to reuse at least a portion of the obtained QoS configuration information, employing the obtained QoS configuration information chosen to be reused, and rebuilding a remainder of the QoS configuration information that fails to be chosen to be reused.

42. The wireless communications apparatus of claim 41, wherein the QoS configuration information includes one or more of a logical channel priority, a Prioritized Bit Rate (PBR), a Maximum Bit Rate (MBR), or a Guaranteed Bit Rate (GBR).

43. A wireless communications apparatus that enables maintaining Quality of Service (QoS) through a mobility procedure in a wireless communication environment, comprising:
- means for obtaining Layer 2 (L2) protocol configuration information for related to Quality of Service (QoS) from a source base station via an interface during an inter-base station mobility procedure, wherein the L2 protocol configuration information is set by the source base station for a radio bearer;
- means for determining whether to reuse at least a portion of the obtained L2 protocol configuration information related to QoS; and
- means for utilizing the L2 protocol configuration information obtained from the base station determined to be reused.

44. The wireless communications apparatus of claim 43, further comprising means for rebuilding the L2 protocol configuration information determined to not be reused.

45. The wireless communications apparatus of claim 43, wherein the L2 protocol configuration information includes at least one of a Packet Data Convergence Protocol (PDCP) parameter, a Radio Link Control (RLC) parameter, a Hybrid Automatic Repeat-Request (HARQ) parameter, or a Medium Access Control (MAC) parameter.

46. A computer program product, comprising:
- a non-transitory computer-readable medium comprising:
- code stored on the medium for obtaining Layer 2 (L2) protocol configuration information related to Quality of Service (QoS) from a source base station via an interface during an inter-base station mobility procedure, wherein the L2 protocol configuration information is set by the source base station for a radio bearer;
- code stored on the medium for determining whether to reuse at least a subset of the obtained L2 protocol configuration information related to QoS;
- code stored on the medium for utilizing the L2 protocol configuration information obtained from the base station determined to be reused; and
- code stored on the medium for rebuilding the L2 protocol configuration information determined to not be reused.

47. The computer program product of claim 46, wherein the L2 protocol configuration information includes at least one of a Packet Data Convergence Protocol (PDCP) parameter, a Radio Link Control (RLC) parameter, a Hybrid Automatic Repeat-Request (HARQ) parameter, or a Medium Access Control (MAC) parameter.

48. In a wireless communication system, an apparatus for wireless communications, comprising:
- a processor; and
- a storage medium coupled to the processor storing codes that when executed by the processor cause the apparatus to:
- receive at least one of uplink Layer 2 (L2) protocol configuration information related to Quality of Service (QoS), or downlink L2 protocol configuration information related to QoS, wherein the L2 protocol configuration information is set by the source base station for a radio bearer; and
- select whether to reuse the at least one of uplink Layer 2 (L2) protocol configuration information for related to Quality of Service (QoS), or downlink L2 protocol configuration information for related to QoS.

* * * * *